AUTOMATIC VARIABLE THRESHOLD CONTROL CIRCUIT

Filed May 28, 1964

3,353,106
AUTOMATIC VARIABLE THRESHOLD CONTROL CIRCUIT

Raymond J. Dudek, Binghamton, Charles G. Mallery, Vestal, and Luther D. Sunderland, Apalachin, N.Y., assignors to General Electric Company, a corporation of New York Filed May 28, 1964, Ser. No. 370,845
3 Claims. (Cl. 328—171)

This invention relates to circuitry for providing variable amplitude threshold blocking to filtered feedback signals in self-adaptive control systems. It functions to produce invariant adaptive sensor operation regardless of changes in noise and disturbance levels. It is particularly useful for insuring proper adaption in self-adaptive flight control systems under differing wind turbulence conditions. In a self-adaptive flight control system, the design goal of invariant response can be considered to require maintaining the loop gain as high as possible without allowing any mode to become too lightly damped and hence discernable to the pilot.

A classical problem in self-adaptive control systems is the separation of intelligence from extraneous noise and other undesirable portions of the particular input signal. Present practical self-adaptive concepts depend upon random disturbances to excite the system in order that a particular characteristic of the control loop can be measured. In flight control systems, aerodynamic disturbances (wind gusts, for example) provide appropriate disturbances. Adaptive sensors, such as the frequency sensor, the area measurement damping sensor, and the digital sensor are sensitive to noise inputs and are therefore provided with threshold circuits. But with random wind disturbances of very large amplitude, causing vertical accelerations such as ±0.5 g., the adaptive gain changers tend to drive the system gain to the lowest possible level. No remedy has been previously found to prevent this occurrence at such levels.

A second problem with prior adaptive sensors is that during flight through extremely smooth air there are not enough disturbances to keep the adaptive mode excited so the gain changers tend to drive the system into an unstable condition by setting the gain too high. To remedy this condition, it is necessary to have a very small threshold on the adaptive sensor. But this conflicts with avoiding sensor saturation in high turbulence conditions.

Accordingly, it is an object of the invention to provide a threshold control which in a self-adaptive control system allows proper sensor operation regardless of the amplitude of disturbances.

Briefly stated, in accordance with certain aspects of the invention, an automatically variable threshold control circuit is provided which lowers the threshold to a low level for low disturbance conditions and raises the threshold for high disturbance conditions. A pair of parallel branches are provided, for respective positive and negative polarity portions of the input signal. In each branch, a diode and a capacitor are connected in series so that input signals tend to build up charges whereby an accumulated voltage across the capacitor opposes the input signals. A discharge resistor is arranged in parallel with each capacitor, and a common voltage dividing resistor is connected in series with the parallel combination so that a desired ratio of variable threshold control is provided. By proper selection of circuit values, the rate at which net charge is accumulated on the capacitors varies to automatically adjust the input voltage threshold level.

The invention, together with further objects and advantages thereof, may best be understood by referring to the following description taken in conjunction with the appended drawings in which like numerals indicate like parts and in which.

Figure 1:
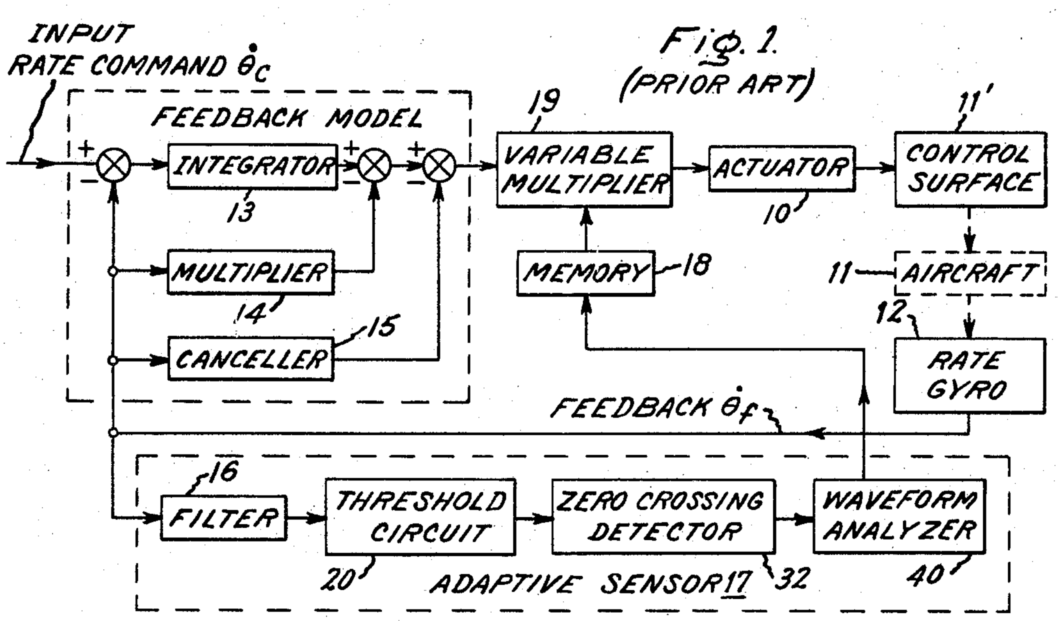
Fig. 1. (PRIOR ART)
FIGURE 1 is a block diagram of a prior art self-adaptive control system.

A successful prior art self-adaptive control system is illustrated by the pitch channel of FIGURE 1. In response to a pilot control stick movement, or other command signal source, an aircraft 11 is controlled in pitch rate $\dot{\theta}$, in accordance with an input rate command signal $\dot{\theta}_c$ and a degenerative feedback signal $\dot{\theta}_f$ derived by a rate gyro 12. Actuator 10 positions the aircraft control surface 11' so that the pitch rate $\dot{\theta}$ of aircraft 11 follows the input signal $\dot{\theta}_c$. The particular signal processing configuration for stability augmentation incorporates integrator 13 which integrates the error signal derived from $\dot{\theta}_c$–$\dot{\theta}_f$ and also introduces the selected fixed gain factor. The integrated error signal $\theta_c$–$\theta_f$ is augmented by signals derived from the feedback signal $\dot{\theta}_f$ by means of parallel multiplier 14 and "canceller" 15. Integrator 13, multiplier 14, and canceller 15 together form an inverse feedback model which modifies the feedback signals in accordance with the nominal aircraft characteristics. This signal processing is adjusted to produce the desired airplane response characteristics in accordance with conventional servo design by selecting the appropriate nominal values for the constants. The system is made self-adaptive by means of the variable gain changer 19 which is adjusted by memory 18 in accordance with variations in the system natural frequency and damping response due to changes in environment, aircraft parameters, etc. For further details of this system, reference is made to the Proceedings of the 1961 Western Electronic Show and Convention (WESCON), "Self-Adaptive Control Through Frequency Regulation," by R. G. Buscher, K. B. Haefner, and M. F. Marx.

Figure 3:
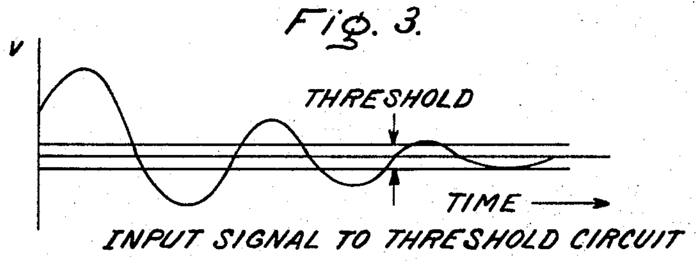
FIGURE 3 is a diagram of a waveform illustrating the threshold effect on an adaptive mode signal.

The adaptive sensor 17 monitors the adaptive mode. The adaptive sensor is preferably of the type disclosed in the copending patent application, "Digital Adaptive Control System Sensor," filed May 26, 1964, by Laurel D. Fry, Ser. No. 370,277 assigned to the same assignee as the present application. The adaptive sensor 17, by means of filtering and cancelling circuits represented by filter 16 isolates the portion of the feedback signal which represents the damping and frequency response characteristics of the control system modes being monitored for adaption. In a flight control system, this typically involves filtering out frequencies outside of the band of 2–5 c.p.s. and cancelling the manual input command signals. The signal derived is then passed through a threshold circuit 20 and zero-crossing detector 32, which can be combined circuits. By this signal processing, the idealized adaptive mode signal of FIGURE 3, which is a damped sinusoidal voltage signal, is separated from most spurious background noise signals and converted to digital form by pulses representing the occurrence of half-cycles which are then processed by waveform analyzer 40. From a comparison of the resulting pulse train characteristics with the desired nominal pulse train, waveform analyzer 40 generates gain changing pulse signals which are then applied to the memory 18.

Figure 2:
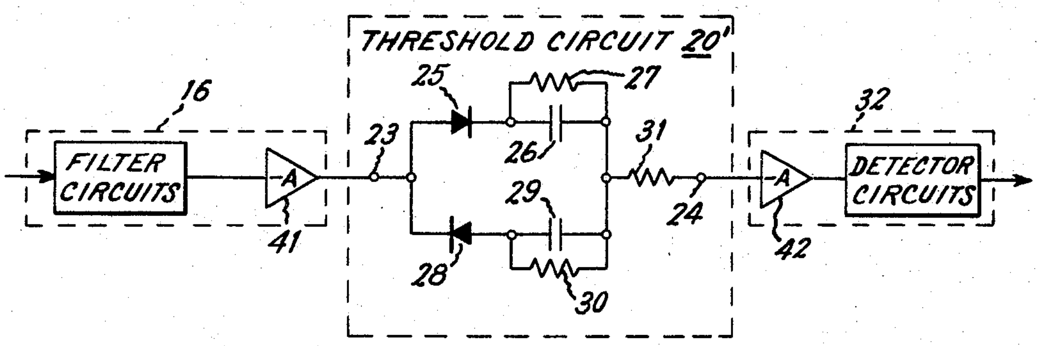
FIGURE 2 is a schematic diagram of an automatic threshold circuit for use in the FIGURE 1 system.

In the FIGURE 2 schematic diagram of a preferred automatic threshold circuit, an input signal is received from a low impedance source such as the output amplifier 41 of filter 16 in an adaptive sensor and an output signal is made available at output terminal 24 for a zero-crossing detector 32 which transforms the signals to a form suitable for the waveform analysis so that suitable adaptive gain changing signals can be generated. A first parallel branch of the threshold circuit consists of a diode 25, capacitor 26 and resistor 27. The anode of diode 25 is connected to the input terminal 23 so as to pass positive polarity signals to the capacitor 26, which has one plate connected to the diode cathode and the other plate connected to the circuit output terminal 24, through a common resistor 31. Discharge resistor 27 is connected directly across capacitor 26 so that the parallel branch will vary the threshold level in accordance with the relative charging and discharging of the capacitor. In the other parallel branch of the threshold circuit, diode 28, capacitor 29 and resistor 31 are connected in the same manner, but with the cathode of diode 28 connected to the input terminal 23. This branch therefore passes negative polarity input signals. The common voltage dividing resistor 31, connected between the output terminal 24 and the parallel combination comprised of elements 25–30, in cooperation with respective discharge resistors 27 and 30, determine the proportion of the input voltage which is applied across the respective capacitors 26 and 29. The output signal is applied to a low impedance load such as the input amplifier 42 of zero-crossing detector 32.

The zero crossing detector will indicate a crossing when its input exceeds an absolute voltage level. (For instance, ±3.7 volts in the digital adaptive sensor.) The automatic threshold control circuit in effect varies this threshold as a function of the average rectified filtered adaptive sensor input signal. The amount of change in the threshold depends upon the size of the filtered input signal averaged typically over the previous 5 second period.

The circuit functions as follows. Assume an input signal applied to the diodes 25, 28 which is a sine wave of 3 c.p.s. and a maximum amplitude of 8 volts. The positive half of the wave will pass through diode 25 and if no previous charge existed on capacitor 26, the signal would pass into the detector 32 and indicate a zero crossing since the full 8 volts would pass. After the signal is applied to the circuit for a short time, capacitor 26 will begin to charge up toward a level which is fixed by the ratio of resistors 27 and 31. Resistors 27, 31 act like a voltage divider so that if they are equal, the capacitor can charge toward 50% of the peak input signal. Negative portions of the input signal pass through the other diode 28 and charge capacitor 29.

When a charge exists on a capacitor, this puts a back bias on the diodes and the input signal then must exceed this voltage level before the diode can begin to pass the signal. This in effect makes the detector threshold its original level plus the voltage across the capacitors.

The capacitors 26, 29 will charge with a different time constant than they discharge. The discharge time constant CR is determined by the resistors 27, 30. The charge time constant is determined by the voltage dividing relation between resistors 27, 30 and resistor 31 so that the effective charging resistance is equal to the parallel combinations. The circuit functions most satisfactorily when the charge time constant is about 0.7 second and the discharge time constant is 7 seconds. This gives a charge ratio of .91.

Because of these properties, the circuit automatically adjusts the threshold level without any external input signals. As a result, the average number of signals applied to the zero-crossing detector 32 and hence waveform analyzer 40 is a constant, as long as the noise and disturbances follow a random pattern or a reasonable equivalent. For an aircraft, this results in essentially the same sampling density, whether the wind conditions are normal, unusually calm, or unusually turbulent. In this respect the threshold circuit is a self-adaptive, and it achieves this function with the use of passive elements only.

While particular embodiments of the invention have been shown and described herein, it is not intended that the invention be limited to such disclosure, but that changes and modifications can be made and incorporated within the scope of the claims.

What is claimed is:

1. A variable threshold circuit comprising:

(a) an input terminal, (b) an output terminal, (c) a resistance-capacitance circuit to accumulate a charge and to release that charge in accordance with its discharge time constant including (1) a branch terminal, (2) two identical branch circuits connected in parallel at said branch terminal, (3) each said branch circuit containing a resistor and a capacitor connected in parallel, (4) a common resistor connected between said output terminal and said branch terminal, (d) two unidirectional conducting devices connected with opposite polarity, one between each said branch circuit and said input terminal in series with said branch circuit whereby the two said branch circuits with their respective unidirectional conducting devices are in parallel between said branch terminal and said input terminal.

2. A variable threshold circuit comprising:

(a) an input terminal, (b) an output terminal, (c) a resistance-capacitance circuit to accumulate a charge and to release that charge with a predetermined discharge time constant including (1) a branch terminal, (2) two identical branch circuits connected in parallel at said branch terminal, (3) each said branch circuit containing a resistor and a capacitor connected in parallel, (4) a common resistor connected between said output terminal and said branch terminal, (5) said resistors and capacitors having resistance and capacitance of predetermined values to produce a discharge time constant in excess of the charge time constant, (d) two diodes connected with opposite polarity, one between each said branch circuit and said input terminal in series with said branch circuit whereby the two said branch circuits with their respective diodes are in parallel between said branch terminal and said input terminal and whereby each said branch circuit will pass only signals in its half wave having a potential in excess of the back bias on its diode as determined by the charge on its condensor at any given time.

3. A variable threshold circuit comprising:

(a) an input terminal for receiving voltage signals representing a transient state of a system to which the circuit is connected, (b) an output terminal, (c) a resistance-capacitance circuit to accumulate a charge and to release that charge with a predetermined discharge time constant including (1) a branch terminal, (2) two identical branch circuits connected in parallel at said branch terminal, (3) each said branch circuit containing a resistor and a capacitor connected in parallel, (4) a common resistor connected between said output terminal and said branch terminal, (5) said resistors and capacitors having resistance and capacitance of predetermined values to produce a discharge time constant of the order of magnitude of ten times the charge time constant, (d) two diodes connected with opposite polarity, one between each said branch circuit and said input terminal in series with said branch circuit whereby the two said branch circuits with their respective diodes are in parallel between said branch terminal and said input terminal, whereby each said branch circuit will pass only signals in its half wave having a potential in excess of the back bias on its diode as determined by the charge on its condensor at any given time and whereby the back bias at any time is a function of the amplitude of a previous signal, the time of application of the previous signal to the resistance-capacitance circuit and the time since application of the previous signal.

References Cited

UNITED STATES PATENTS

| | | | |
|---|---|---|---|
| 2,469,383 | 5/1949 | Gibbs et al. | 324—111 XR |
| 2,497,693 | 2/1950 | Shea. | |
| 2,571,650 | 10/1951 | Atwood. | |
| 2,851,600 | 9/1958 | Brett. | |
| 2,924,769 | 2/1960 | Harriman et al. | 324—103 XR |
| 3,139,533 | 6/1964 | Midkiff | 307—88.5 |

RUDOLPH V. ROLINEC, *Primary Examiner.*

WALTER CARLSON, *Examiner.*

P. F. WILLE, *Assistant Examiner.*